(12) United States Patent
Harris

(10) Patent No.: US 7,648,658 B2
(45) Date of Patent: Jan. 19, 2010

(54) ALTERNATE POLYMER EXTRUSION METHOD WITH REDUCED DROOL

(75) Inventor: Holton E. Harris, Westport, CT (US)

(73) Assignee: Harrel, Inc., East Norwalk, CT (US)

( * ) Notice: Subject to any disclaimer, the term of this patent is extended or adjusted under 35 U.S.C. 154(b) by 764 days.

(21) Appl. No.: 10/872,315

(22) Filed: Jun. 19, 2004

(65) Prior Publication Data
US 2005/0017387 A1 Jan. 27, 2005

Related U.S. Application Data

(62) Division of application No. 09/775,138, filed on Feb. 1, 2001, now abandoned.

(60) Provisional application No. 60/180,580, filed on Feb. 4, 2000.

(51) Int. Cl.
*B29C 47/06* (2006.01)
*B29C 47/56* (2006.01)
*B29C 47/92* (2006.01)

(52) U.S. Cl. .................. 264/40.7; 264/167; 264/176.1; 264/211.23; 425/132; 425/133.1; 425/141; 425/145; 425/382.4; 425/462; 425/465

(58) Field of Classification Search ............... 264/40.3, 264/40.7, 167, 176.1, 211.23; 425/132, 141, 425/145, 382.4, 462, 465, 133.1
See application file for complete search history.

(56) References Cited

U.S. PATENT DOCUMENTS 2,366,417 A * 1/1945 MacMillin ............... 264/176.1
4,209,476 A    6/1980 Harris
4,492,549 A * 1/1985 Rasmussen et al. ...... 425/131.1
4,613,471 A    9/1986 Harris
4,789,589 A * 12/1988 Baxter ..................... 428/317.5
4,907,957 A    3/1990 Nakagawa et al.
5,204,120 A    4/1993 Hirschberger
5,695,789 A    12/1997 Harris
5,725,814 A    3/1998 Harris
6,663,614 B1   12/2003 Carter

* cited by examiner

*Primary Examiner*—Robert B Davis
*Assistant Examiner*—Joseph Leyson
(74) *Attorney, Agent, or Firm*—Gallagher & Kennedy, P.A.; Thomas D. MacBlain

(57) ABSTRACT

An alternate polymer extrusion method and system reduces "drool" effects that detract from precise control over the content of two or more materials in an extrudate along its length. In the system, two or more extruders direct melt to two or more gear pumps. Control of the speed of the gear pumps controls the amount of each material emergent from the pumps, proceeding to a convergence in the paths from the pumps and thence to a die. Melt in each path between each pump and the convergence tends to expand and drool into the convergence as its associated pump is slowed and stopped. To prevent this, in the die, a constriction in each path just upstream of the convergence greatly reduces drool past that point by requiring a much greater pressure to force the melt past the constriction. The increased pressure required increases compression and expansion of the melt between the pump and the construction as a pump starts or increases in speed, on one hand, and stop or decreases in speed, on the other hand. Compensatory pump speed changes are made to counter this effect.

9 Claims, 4 Drawing Sheets

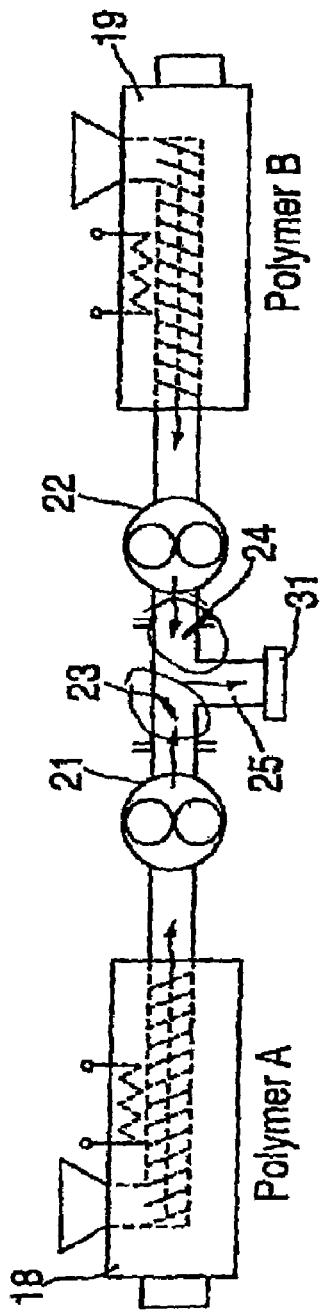
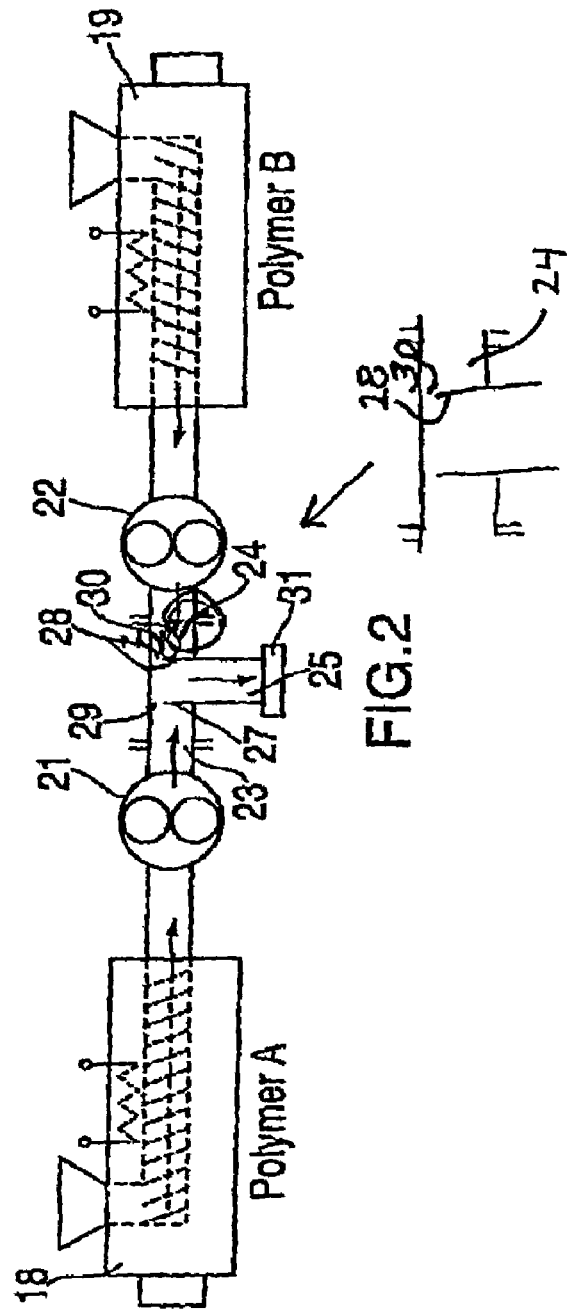

ALTERNATE POLYMER EXTRUSION METHOD WITH REDUCED DROOL

CROSS-REFERENCE TO RELATED PATENTS AND APPLICATIONS

This application is a divisional of application Ser. No. 09/775,138 filed Feb. 1, 2001 of Holton E. Harris, now abandoned. Priority from that application is claimed. application Ser. No. 09/775,138 claims priority from U.S. provisional patent application Ser. No. 60/180,580, filed Feb. 4, 2000, entitled Alternate Polymer Extruding System with Reduced Drool. This is an improvement in the coextrusion system and method of U.S. Pat. No. 5,725,814 ("the '814 patent") entitled Extrusion of an Article of Varying Content issued Mar. 10, 1998, incorporated herein by reference.

FIELD OF THE INVENTION

This invention relates to alternate polymer extrusion systems, and more particularly to alternate polymer extrusion systems for more precisely varying the content of material along the length of an extrudate.

BACKGROUND OF THE INVENTION

The above-referenced '814 patent describes a system for altering the content of an extrudate along the length of the extrudate using speed controlled gear pumps (sometimes referred to herein as "melt pumps") to meter melt flowing in two or more extrusion lines that converge in a single die as schematically shown at 31 in FIGS. 1 and 2.

The expressions "alternate polymer extrusion," "alternate polymer extrusion system," and the like are not intended to limit the invention described herein solely to polymers, but to refer to extrusion of two or more materials that may include, for example, rubber or another material. Also, alternate polymers and polymers A and B as referred to herein may refer to the same polymers, but having, e.g., different durometers, colors, or other properties.

The aforementioned '814 patent relates to an alternate polymer extrusion system by which is meant a system that extrudes an extrudate that varies in content along its length. This can be, for example, a coextrusion of discrete layers varying in thickness or an extrudate that changes over from one material to another and back to the original material. The basic concepts of the '814 patent are completely validated. However, when the concepts of that '814 patent were extended to different sizes and types of tubing and different polymers, several problems arose. The use of melt pumps pursuant to my '814 patent is by far the most promising way to make alternate polymer tubing, profiles, sheet, etc., which change from one polymer to another repeatedly along their length. As explained in the '814 patent, other methods can alternate the constituents and make certain configurations, but do not come close to what the patented system can do. Several rather significant additions to the basic system are being added, as described here, to make a versatile system for producing high quality tubing.

In the system to which this invention relates, two or more extruders are used. An extruder is very good at many things:

(a) It can convey plastic pellets into a melting zone.

(b) It can melt them by adding frictional heat.

(c) It can mix various components quite well.

(d) It can generate the pressure to force plastic through a die.

What it cannot do is meter the plastic or other material accurately. The output of an extruder is heavily dependent on the back pressure. The output of an extruder will vary about 10% for every 1000 PSI variation in the pressure which the screw sees at the output. Further, when the extruder is used in a coextrusion set-up, where two or more extruders feed the same die, with each output forming one layer of a tube, sheet, profile, or the like, the output of each extruder is affected not only by the pressure caused by that particular extruder, but also by pressure changes in all the other extruders on the same die. In other words, the extruders react to each other. A further problem is that an extruder is not a positive shut-off device. There is always an open channel in the screw that moves melt in the extruder, and the extruder can "drool" even when the screw is not turning.

These conditions strongly militate against using extruders alone in an alternate polymer system. If one extruder is ramped up and the other down, the net result will not be proportional to the sum of the RPM of the two screws. The output of each extruder will be highly non-linear.

In the '814 patent, therefore, one uses a gear pump, or melt pump, on the output of each extruder. A gear pump is essentially a series of measuring cups on a wheel. The plastic fills the gear teeth at the input, travels around to the output side, where it finds that it cannot go through the tightly meshed gears, and so has no choice but to go out of the output. The output is highly precise. When the Harrel differential pressure control described in U.S. Pat. No. 4,209,476 is used around the pumps in an alternate polymer system, stability of output is typically 0.1%, and it is almost completely independent of what is happening in the other extruders. The U.S. Pat. No. 4,209,476 entitled Method and Apparatus for Fabrication of Extruded Articles, issued Jun. 24, 1980 (the '476 patent) is incorporated herein by reference. In the steady state, the extruders can be ramped up and down, and the output will be almost exactly proportional to the sum of the RPM's of the two melt pumps. One can thus ramp the speed of one up and the other down in such a way that the sum of the two RPM's stays the same, and, in the steady state, the total volume in the output will stay the same.

Correction for Differing Constituent Characteristics

One might suppose that in a tubing line, for example, if the volumes of polymer A and polymer B are the same, the dimensions of the tube the line forms would also be the same. Unfortunately, this is only true in the case where the two polymers have identical durometers, elasticity, and other physical characteristics. If two different polymers are extruded under identical operating conditions, the tubes the two make will differ in dimensions. The same is true for profile, sheet, or other extrusions.

The Harrel TUBETROL® extrusion control system provides a means for control of both ID and OD of tubing. The Harrel TUBETROL® extrusion control system and other Harrel products referred to herein are available from Harrel, Incorporated, 16 Fitch St., East Norwalk, Conn. 06855. The Harrel SHEETROL, PROFILE-TROL, extrusion control systems and other control systems can control the dimensions of other shapes. The Harrel BUMP TUBETROL extrusion control system is used to control operating parameters of the line such that the OD and ID of the tubing varies (or is sustained) along the length in a controlled manner. It is clearly possible to use these same techniques, not to create a variation in OD and ID, but rather to prevent it. The Harrel BUMP TUBETROL control system's techniques can also be used to produce dimensional variations along the length of the tube independent of the alternate polymer effects.

It is to be expected, therefore, that as the change is made from polymer A to polymer B in an alternate polymer extrusion, the Harrel BUMP TUBETROL control system's techniques will have to be used to compensate for differences in tubing dimensions caused by the change of material. This was perceived previously and is discussed in the '814 patent.

Compensation for Die Layer Drool

What was not considered in the '814 patent was the fact that there would still be significant "drool" from the output of each layer of the coextrusion die. Although drool is considerably improved by the use of the gear pumps, there is a significant volume of melt in the channels from the output of the melt pumps, where positive shutoff occurs, to the output of the die. In a typical system, an adapter downstream of the melt pumps is followed by a clamp from which the melt path leads to the die. The melt resident in the adapter from the melt pump to the clamp, and in the paths from the clamp to the die, plus the melt in the die channel itself from input of the die for that particular layer, through to the output of the die, must be kept to a minimum. It can never, however, be zero, and if nothing is done, that volume will "drool" out into the melt stream even when the melt pump for that layer is stopped.

Using a commercially available Genca Tri-die in an alternate polymer system to extrude tubing, the transition between polymer A and polymer B stretched over many inches of the tubing. This is unsatisfactory for applications of alternate polymer tubing in which one of the chief qualities being sought in the tubing was as short as possible a transition from one polymer to another of perhaps two to four inches. There was thus a need to reduce the drool of polymer from the melt path downstream of a gear pump when the gear pump slows or stops.

SUMMARY OF THE INVENTION

In accordance with this invention, constructions or "pinch points" are provided downstream of the gear pumps in an alternate polymer extrusion system to increase the pressure that must be exerted on the melt upstream of the pinch points so as to reduce "drool" of excess melt as the associated gear pump slows or stops. More specifically, the drool problem was solved by designing a special coextrusion die in which, in addition to keeping the inventory in the die as low as possible, the die was designed with a major pinch point as near to the output of each melt path as possible. Where the die is a coextrusion die, the pinch points are as near to the convergence of each layer as possible.

In one preferred embodiment of the alternate polymer extrusion system having the improvement in accordance with this invention, a controller is coupled to the first and second gear pumps to vary the speed and hence the throughput of the first and second gear pumps. The controller is programmable to vary the speed and timing of the first and second gear pumps to compensate for the effect of the pinch points. The movement of melt past each pinch point occurs more slowly than would occur in the absence of the pinch point by virtue of compression of the melt with increased pressure developed between the gear pump and the pinch point. The controller is programmed to increase gear pump speed to more quickly develop the needed higher pressure. With slowing or halting of each gear pump, the decrease in the movement of melt past each pinch point is slower than would occur in the absence of the pinch point. By virtue of expansion of the melt with decreasing pressure between the gear pump and the pinch point, melt continues to move past the pinch point. The controller slows the gear pump more rapidly or reverses it to compensate for this effect as well.

In one preferred embodiment, a sensor measures a dimension of an extrudate during the extrudate's production. The sensor is connected to the controller. Lag time programming of the controller associates a lagging dimensional change with a preceding change of speed of at least one of the gear pumps. This permits repetitive gear pump speed changes being compensated by the controller to effect reduction or elimination of the dimensional anomaly in subsequent gear pump speed changes. Put another way, the system determines when a gear pump speed change will have a dimensional effect and assures that corrective action is made at the appropriate time.

In a specific embodiment, a display coupled to the controller shows a plot of dimensional characteristics of the extrudate in comparison to a plot of gear pump speed each versus distance along the extrudate.

A further aspect of this invention is a die having at least first and second melt paths coming together at a convergence and having constrictions in each of the melt paths at the convergence.

In a further preferred embodiment of the invention, a controller controls a number of dimension-affecting parameters such as gas pressure differential between the interior and exterior of a hollow extrudate and puller speed, as well as the gear pump speeds. Compensatory dimension controlling corrections can be made in one or more of these parameters to compensate for and avoid the dimensional effects from increased melt compression as previously described.

The above and further objects and advantages of the invention will be better understood from the following detailed description of a preferred embodiment taken in consideration with the accompanying drawings.

BRIEF DESCRIPTION OF THE DRAWINGS

FIG. 1 is a diagrammatic illustration of an alternate polymer extrusion system known in the prior art.

FIG. 2 is a diagrammatic illustration of the same alternate polymer extrusion system equipped with constrictions in flow paths between the pair of gear pumps and the die for the purpose of explanation of the invention.

DETAILED DESCRIPTION

Constrictions to Prevent Drool

Figure 3:
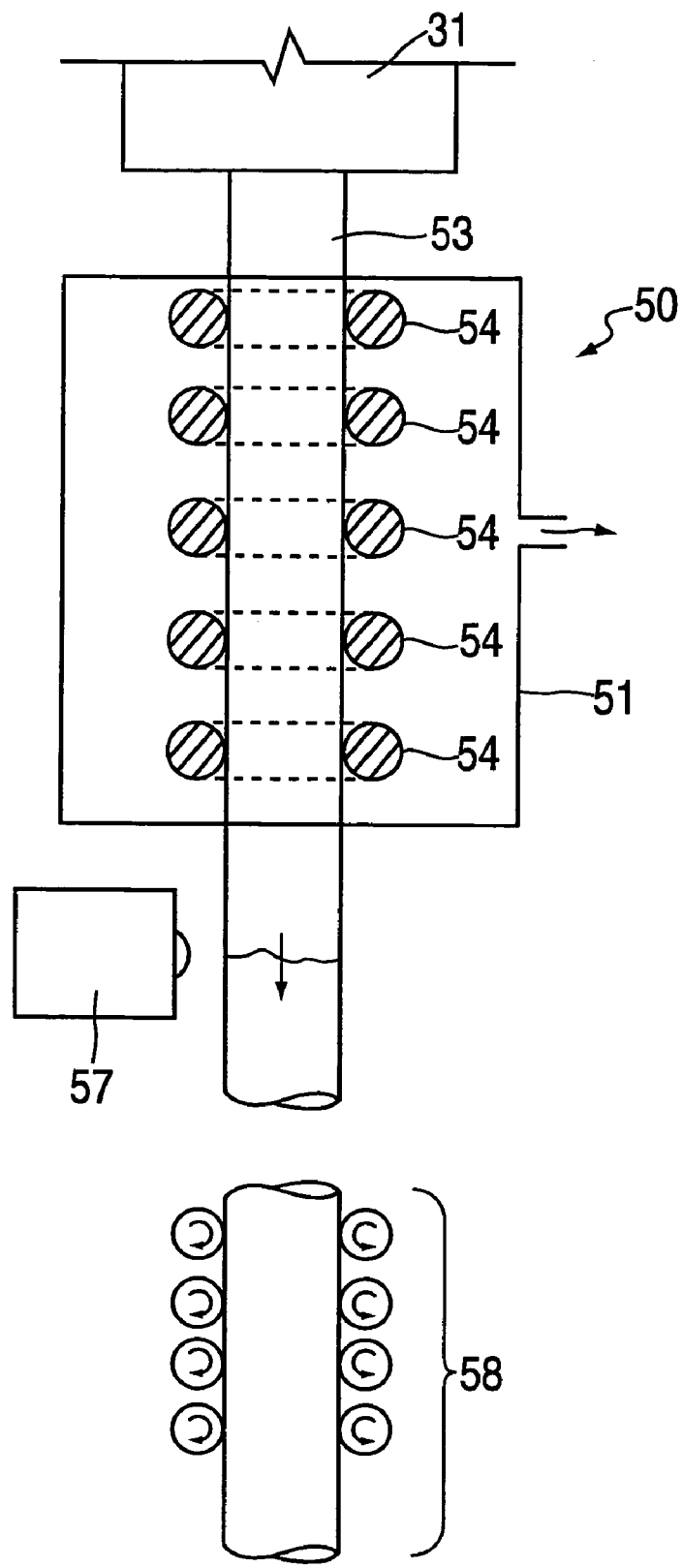
FIG. 3 is a fragmentary, diagrammatic illustration of an extrusion line downstream of the die.

The principle of this invention can be described using the diagrammatically illustrated system shown in FIGS. 1 and 2. FIG. 1 is representative of the practice of the alternate polymer system prior to the present improvement. A first extruder 18, shown on the left, supplies a melt of a polymer A to a first gear pump 21. A second extruder 19, shown on the right, supplies a melt of a polymer B to a second gear pump 22. If one has a plastic stream coming in from the left gear pump 21 along the left branch 23 for a period, and suddenly stops the gear pump 21 and starts the gear pump 22 feeding the right branch 24, then one is going to find that the plastic in the left branch will drool out for quite a long time. This will occur pretty much until the left branch 23 is emptied of plastic melt. This effect is aggravated by Bernouilli's principle, which provides that a fluid flow past an orifice will create a suction.

Referring to FIG. 2, there has been erected in each of the two paths a barrier 27 and 28. One can still get plastic through each one, but it takes greatly increased pressure—enough to force the plastic through the relatively small orifice 29 or 30, the pinch points or constrictions. When the left hand pump 21 stops, and the right one 22 starts, there will still be some Bernouilli effect sucking plastic out of the left branch 23, but it will be greatly reduced because of the fact that it takes a lot of motive power to force the plastic through the small orifice.

In other words, the improved system of this invention greatly reduces the cross-sectional area of the path just before where a given layer or flow of melt joins the flow to the output of the die. It now takes considerable pressure to force the plastic beyond this pinch point. When the pump stops, this pressure is not generated, and no (or significantly less) plastic will drool past the pinch point.

In order to form a tube, there must be a straightaway section 25 after the two layers join (or concentric sections in the case of coextruded tubing). The length/diameter ratio of this straightaway section has an important bearing on the shape of the final tube. Because plastic has a memory, this section must be long enough so that the tube will get and retain a good tubular shape. As long as it is not long enough to require pressure comparable to that at the pinch points, however, it will have no effect on the transition from one polymer to the other. The two paths should, however, combine just as close to where this straightaway section begins as possible, because any volume after the pinch point will form a reservoir for that polymer which will drool when the other polymer begins to move past it.

In a coextrusion system for extrusion of two or more layers, with a pronounced pinch point on each layer's path of movement, and an absolute minimum volume of each layer between that pinch point and the joining of the two streams, there will be an absolute minimum of drool, and the transition will be as short as it can be. Results are much better than obtained with the mentioned Genca die, where the back pressure on both layers is deliberately kept low, and there is thus no barrier to drooling from a given layer when its melt pump slows or stops.

Compensating for Compression of the Plastic Due to the Constrictions

Adding the pinch points at the output of the path for each layer in a multilayer coextrusion embodiment eliminated the drool from one layer while the other one is moving melt. In effect, it shuts off the melt path not active. The melt pump makes it possible to push melt past that pinch point, or point of reduced cross-sectional area of the path, and out to the output when the system calls for the second constituent.

To push melt past the pinch point 29 or 30 when it is called for, the melt pump 21 or 22 has to generate considerable pressure in the melt in the passage 23 or 24. The melt pump can easily generate the pressures required. However, plastic is compressible. Soft polymers—those of low durometer—are more compressible than hard ones.

In an alternate polymer tube that changes from one polymer to another and back, for example, this is not a problem in the steady state, constant polymer sections. As noted above, using a controller 90 of the nature of that shown diagrammatically in FIG. 5, BUMP TUBETROL tube extrusion control system's techniques, the control technique described in the '814 patent can compensate for differences such as the same extrusion conditions not producing the same dimensions in different polymers, due to differences in the ductility and other characteristics of the polymers. As the '814 patent teaches, the Harrel BUMP TUBETROL control system's technique changes the air pressure inserted into the center of the tube, and the puller speed, as required to keep the dimensions at the desired value for both polymer A and polymer B sections of the tube. However, at the transitions from one polymer to the other, problems arise that should be addressed.

When one of the pumps 21 or 22 stops pumping, the plastic tends to continue to flow for a while because of the built-up pressure in the plastic. As this relaxes, it tends to push some plastic through the constricted orifice at barrier 27 or 28. This means that the transition does not occur cleanly and in particular, it is somewhat delayed after the pump stops.

By the same token, when one of the melt pumps slows down, to start throttling back on its plastic component, the "spring" action caused by the plastic decompressing and expanding, tends to prolong the delivery of that polymer past what it would be without compression. Again, left uncorrected, the total volume is not what the system is expecting or what was intended. This would cause a departure from the desired extrusion dimension.

However, that is a relatively minor effect. A much larger one occurs when one gear pump turns off and the other one is started. It takes a finite time after a gear pump 21 or 22 is started, for example, for the melt to compress and for the pressure to build up to the point where the melt is forced through the orifice. The transition is thus delayed. In other words, with a soft, or highly compressible melt, there is a time lag between the time a melt pump starts turning and the time the melt gets sufficient pressure build-up to force melt beyond the pinch point and into the output. Subsequently, when this reduction in the total volume of melt emerges from the die, the tube is smaller than would be expected, because there isn't as much melt volume through the die as the system expects. With the pinch points used to ensure a short transition, there is no way to avoid causing compression of the melt due to the high back pressure. The new problems occur, however, over only a short distance at each transition. Compensation was therefore built into the system.

Figure 5:
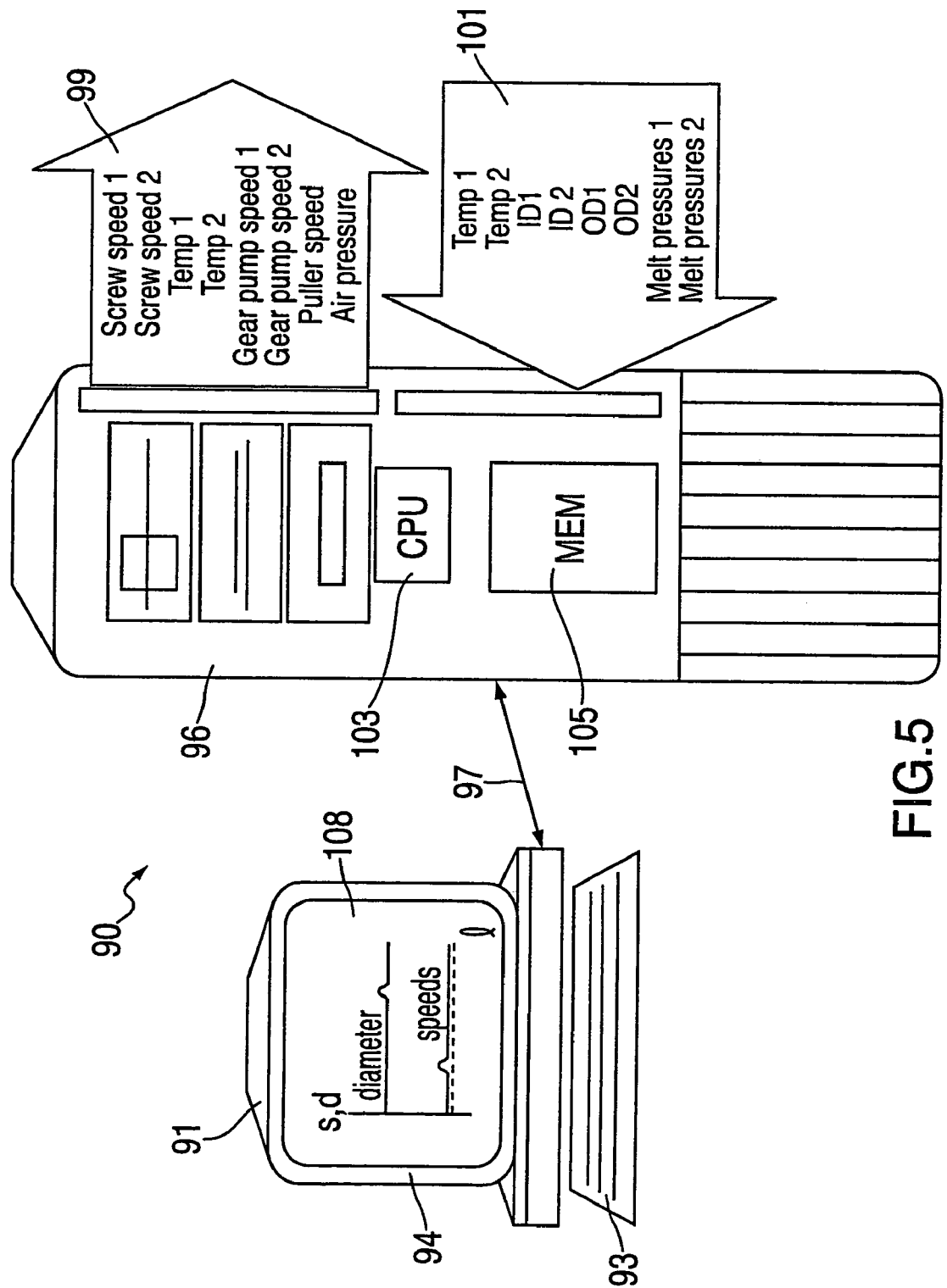
FIG. 5 is a schematic block diagram with a controller for use in operating the system of the invention.

As shown in FIG. 5, the controller 90 includes a console 91 with a keyboard 93 and a monitor 94. An example of one such controller suitable for use in this system is the Harrel CP-873 Digipanel Controller, available from the assignee of this invention, Harrel, Incorporated, 16 Fitch St., East Norwalk, Conn. 06855. The console 91 is in communication with an extruder control computer 96 as indicated at 97. Outputs 99 of the control computer 96 control screw speeds in the first and second extruders 18 and 19, the melt temperatures, the speeds of the two gear pumps 21 and 22, the speed of a puller 58 (FIG. 3) and air pressure within a hollow extrudate. Inputs 101 to the control computer 96 include detected temperatures in the two extruders 18 and 19, inside diameter of the extrudate in the case of a tubular extrusion, outside diameter or width of the extrudate, and melt pressures upstream and downstream of the gear pumps 21 and 22 for the control purposes described in the above-mentioned '476 patent. The control computer 96 includes typically a CPU 103 and memory 105. The memory 105 retains programming controlling the operation of the extrusion system, data retrieved from sensors and input as the inputs 101, and parameters such as target temperatures, air pressure and puller speed input from the console 91.

The programming of the controller 90 includes a plotting routine that shows the diameter as a function of distance along the tube. This is displayed on the monitor 94 at 108. It always begins at the same point, and two successive traces are plotted, to facilitate adjustment. The timing can be adjusted to make the plot begin at any desired point. The length of the plot is divided into segments, initially 512, but subsequently upgraded to 1024. The programming provides separate plot

69 in this same display which shows the speed of each pump as a function of the position along the length of the tube—in other words at each of the segments along the length.

The programming of the controller 90 allows the choice of another display on the monitor 94 to show the diameter plot as the primary graph, plus a secondary one showing air pressure inserted inside a tube or other hollow extrudate as a function of position along the tube length. A third display is afforded by the programming that shows the diameter plot as the primary function with a plot of puller speed vs. position along the length beneath it. As the individual parameters of pump speeds, air, or line speed, are varied, the primary plot in each case shows the diameter as a function of length along the tube, and the secondary plot shows the values of one of the parameters of the line which exists at each point. By this it becomes possible to measure the time lag in the system by introducing an upset in one of the independent variables and seeing where its effect on the diameter occurs along the plot of diameter vs. length.

More important, it now becomes possible to correct for "jogs" in the diameter curve by introducing a correction in one of the independent variables at the position of the jog taking into account the time lag. Correction of the differential in gas (typically air) pressure between the inside and the outside of a tube as discussed below is the principal corrective action for tube outside diameter. For another example, if the diameter is too small at a given point in the transition, it can be increased by introducing a corrective boost in the speed of the corresponding melt pump over what it would otherwise be. This increases the cross-sectional area of the extrudate. The boost will show up in one or more of the segments of the lower plot, and the diameter will be modified by the effect of that boost. Using this means, it is possible to sculpt a constant diameter plot, for example, by correcting for every upward and downward jog in the diameter with a correction—that is by a deviation of one of the line system parameters from what it would otherwise be. By adjusting the timing of the gear pump start-up, it is possible, too, to take into account the delay that comes from the need to build pressure upstream of the pinch points. Similarly, adjustment is made for the delay in melt delivery that results from elastic expansion of the melt and diminution of the pressure when a pump is slowed or stopped. Pump speed can be reduced more rapidly or the pump may be reversed to more quickly reduce the pressure that causes delay in the cessation of the flow of melt.

Compensation may be used for inside diameter, using the principles of the Harrel TUBETROL® tube extrusion control system, which is the tube extrusion control technique set forth in my '476 patent mentioned above. Further, the corrective process can be automated. In that case, the system scans the values. It puts an upset into a parameter and scans again. The position of a major change will show what the time lag is. A correction is entered and its effect noted. Successive corrections eliminate the anomaly.

The same system can be used for extrusions of any number of layers. Likewise the same general principles apply not just to tubing extrusion, but also to any form of extrusion.

Vacuum Sizing

To effect an on line correction that will make the outside diameter of a tube or other hollow extrudate turn out at the value one wants, one of two things is done.

On one hand, air or another gas can be inserted into the center of the tube to blow it up until it is the proper diameter. This is shown in my '814 patent.

On the other hand, as shown in FIG. 3, the extrudate can be directed through a vacuum chamber 51 of a vacuum sizer 50 to lower the pressure on the outside of the tube 53 while keeping atmospheric pressure inside. This is vacuum sizing. It is customary in vacuum sizing to have a constraint so that the vacuum pulls the tubing up against the inside of a set of sizing rings 54, or a sizing tube. This constrains the diameter, so that it is not dependent just on the differential in pressure, but is brought up to a level determined by the inside diameter of the rings or the sizing tube.

Obviously, both gas insertion and vacuum sizing depend on the difference in pressure from that inside the tube to that outside. The exterior constraint used in the vacuum system is the main difference. In general, gas insertion is used for the smaller tubing, while vacuum sizing is used for larger. There are two reasons for this. First, with large tubing, the gas put inside the tube tends to run out of the end. Second, it is harder to keep the tubing round as the diameter gets larger with free air. Using sizing rings 54, or a sizing tube, vacuum sizing keeps the extrudate round. A vacuum sizer 50 after the die, as shown diagrammatically in FIG. 3, overcomes the tendency of the outside diameter of the tube 53 to change as the tube goes from one polymer to the other. Only if a reduction in diameter which would otherwise occur is large enough and sudden enough, would it break the vacuum by breaking the sealing engagement of the tube exterior with the vacuum chamber at the entry point, so that the entire system would come down.

As noted above, as one starts up the previously idle pump, the first bit of the rotation does not really pump the full measure of melt, but rather first compresses the melt in the idle section. The amount that comes through is less than it should be. In the air insertion technique, this reduces both the outside diameter and the thickness at the transition. If a vacuum sizer is used downstream, it does not allow the outside diameter to change, but the inside diameter still changes, since there is not the proper volume of plastic coming through to maintain the thickness. One needs to correct by speeding up the previously idle melt pump more than normally required, or by reducing the speed of puller 58 to reduce the rate at which the volume is taken away. While this is possible, there remains the problem of how to tell what is happening to thickness. Normal calculations of the Harrel TUBETROL® tube extrusion control system use the Harrel TUBETROL® control system to calculate thickness based on throughput of the gear pump, puller speed, and outside diameter. Here, however, the full volume pumped by the gear pump during transition is not going into changing the dimensions. Part of it is compressing the melt. Calculations like the Harrel TUBETROL® control system's calculations will not correctly provide inside diameter.

One way to determine this is with an ultrasonic thickness gauge 57, as known in the art. While their accuracy is not spectacular, typically 10% or so, this is considered good enough because only relative thicknesses are being considered. I.e., the thickness during a transition is considered relative to that of the extrudate portions in which content is not changing. Again, the measurement at the point where the gauge is located has to be related to die and pump occurrences to determine what is happening at the die to cause the noted effect at the gauge. This is possible because the time lag can be determined as discussed in the '814 patent and as discussed above. Therefor, vacuum sizing can be a successful way of implementing the alternate polymer techniques and for controlling extrudate dimensions with the improved, pinch point approach described.

Figure 4:
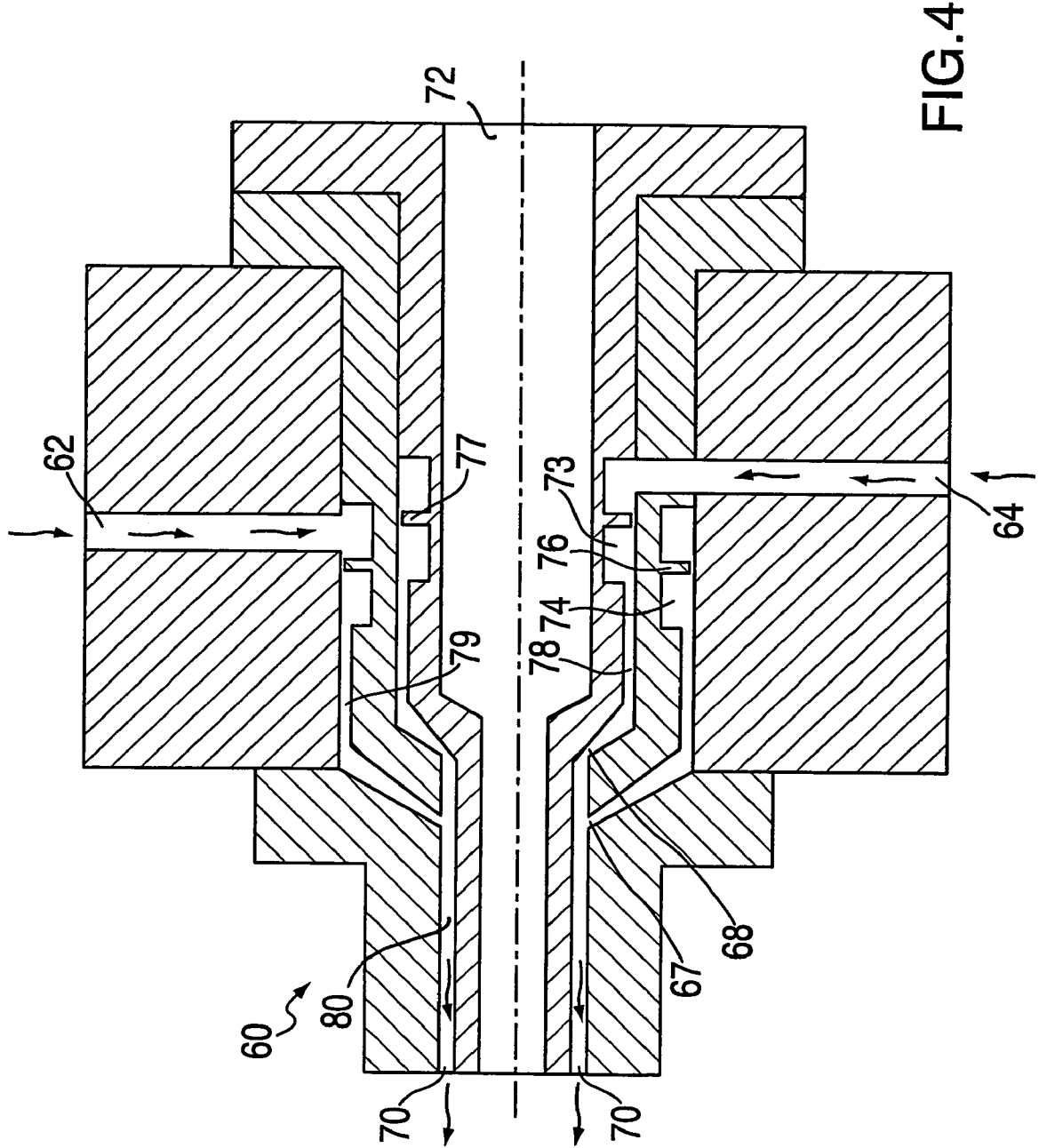
FIG. 4 is a cross-sectional illustration of a coextrusion die in accordance with the present invention.

In FIG. 4, a cross-section of a tube-extruding die 60 formed in accordance with this invention is shown. It is fed by two melt paths 62 and 64. Each melt path is fed plastic from an upstream gear pump not shown. Two pinch points 67 and 68 constrict the flow paths to a die outlet 70 and act as the barriers 27 and 28 of FIG. 2. Air is introduced into the tube along the open pathway 72.

Each path 62 and 64 has a "leaky" spiral melt channel 73 and 74. These direct the melt in the respective paths at least partially along the spiral channels while some leaks between channels as at 76 and 77. The melt then enters concentric cylindrical flow channels 78 and 79 upstream of the pinch points. The "leaky spiral" channels effect mixing of the melt on the way downstream to a pinch point. This largely avoids formation of a seam or discontinuity along the length of the extruded tube such as can occur when the melt encounters an upstream obstacle about which it flows and reunites. The pinch points 67 and 68 here are encircling constrictions at the joinder of annular paths 78 and 79. Downstream of the convergence of the two melt paths, a single annular path 80 proceeds to the die outlet 70. The pinch points are immediately adjacent to the convergence of the two paths of melt flow, virtually eliminating drool of residual melt of one path into another.

The foregoing preferred embodiments of the invention are exemplary and should not be understood to restrict the scope of protection of the invention. Various modifications and alterations will be readily apparent to those skilled in the art without departure from the spirit and scope of the invention as set forth in the appended claims. For example, extrusion dies having as many as five melt paths are known in the art. Constricting each such melt path consistent with the foregoing is well within the scope of this invention.

What is claimed is:

1. A method of alternate polymer extrusion comprising:
   (a) providing a first extruder including a first gear pump,
   (b) providing a second extruder including a second gear pump;
   (c) supplying a melt of a first material to the first gear pump;
   (d) supplying a melt of a second material to the second gear pump;
   (e) directing the melt of the first material along a first melt path from the first gear pump;
   (f) directing the melt of the second material along a second melt path from the second gear pump;
   (g) providing a convergence of the first and second melt paths;
   (h) directing the melt of at least one of the first and second materials from the convergence of the first and second paths to an outlet of a die;
   (i) extruding the melt of the at least one material by forcing through the die;
   (j) varying the speed of the first and second gear pumps to vary the rate of flow of the melts of the first and second materials to the convergence; and
   (k) providing constrictions constricting each of the first and second melt paths proximate the convergence sufficiently to at least substantially reduce drool of melt out of the first and second melt paths to the convergence upon substantial slowing or stopping of one of the gear pumps.

2. The method of alternate polymer extrusion according to claim 1, further comprising:
   (l) repeatedly varying the speed of each of the gear pumps to repeatedly vary the content of the first and second materials in an extrudate emerging from the die.

3. The method of alternate polymer extrusion according to claim 2, further comprising:
   (m) initially imparting a compensatory increase in the speed of each gear pump in addition to each speed increase of that pump for increased delivery of the melt of one of the first and second materials therethrough, the compensatory increase in speed compensating for initial compression of that melt between the gear pump and one of the constrictions as that pump starts or increases in speed.

4. The method of alternate polymer extrusion according to either of claims 2 or 3, further comprising initially imparting a compensatory decrease in the speed of each gear pump in addition to each speed decrease of that pump for decreased delivery of the melt of one of the first and second materials therethrough, the compensatory decrease in speed compensating for the initial expansion of melt between the gear pump and one of the constrictions as that pump slows or stops.

5. The method of alternate polymer extrusion according to claim 2, further comprising determining a dimension of an extrudate emerging from the die, and controlling a dimension-affecting parameter of the alternate polymer extrusion method to control said dimension.

6. The method of alternate polymer extrusion according to claim 5, wherein the dimension-affecting parameter is the speed of at least one of the gear pumps.

7. The method of alternate polymer extrusion according to claim 6, further comprising determining the lag time between a pump speed alteration and a resultant dimension variation, and wherein controlling the dimension-affecting parameter includes timing corrective pump speed of the at least one pump to control the dimension at a location along the extrudate that is subsequently extruded.

8. The method of alternate polymer extrusion according to claim 5, wherein controlling a dimension-affecting parameter comprises controlling a pressure differential between the interior and the exterior of a hollow extruder.

9. The method of alternate polymer extrusion according to claim 5, wherein controlling a dimension-affecting parameter comprises controlling the speed of a puller.

* * * * *